3,734,893
PROCESS FOR THE MANUFACTURE OF LINEAR
AROMATIC POLY-1,3,4-OXADIAZOLES
Josef Studinka, Zurich, and Rudolf Gabler, Uitikon,
Switzerland, assignors to Inventa A.G. fur Forschung
und Patentverwertung, Zurich, Switzerland
No Drawing. Filed Oct. 19, 1971, Ser. No. 190,676
Claims priority, application Switzerland, Oct. 29, 1970
15,981/70
Int. Cl. C08g 33/04
U.S. Cl. 260—78.4 R                            18 Claims

ABSTRACT OF THE DISCLOSURE

Process for the manufacture of linear aromatic poly-1,3,4-oxadiazoles by reacting in chlorosulphonic acid an inorganic hydrazine salt and an aromatic dicarboxylic acid.

---

The present invention concerns linear, aromatic poly-1,3,4-oxadiazoles, a process for their manufacture and their use for the production of articles like fibres and foils.

The aromatic polyoxadiazoles are valuable starting materials for the manufacture of high temperature resistant synthetic fibres. High molecular poly-1,3,4-oxadiazoles have previously been made in two different ways. According to one process (Frazer, Sweeny and Wallenberger J. Pol. Sci. A2, 1964, 1157) aromatic acid dichlorides are first converted with hydrazine in hexamethyl phosphoric acid triamide or N-methylpyrrolidone to the aromatic polyhydrazide and the latter then thermally dehydrated at 280°–350° to the polyoxyadiazol. From the technical standpoint, in this process the high cost of solvent and the long reaction time of the thermal dehydration are unattractive.

According to another process (Y. Iwakura, K. Uno and S. Hare, J. Pol. Sci. A.3, 1965, 45) the aromatic dicarboxylic acids are reacted with hydrazine sulphate in 30% oleum or polyphosphoric acid, whereby the polyoxadiazole is formed directly in one stage. The polymer solutions so obtained can be spun directly into fibres (Y. Imai, Journal Appl. Pol. Sci. 14, 1970, 225).

Although the second process forms a considerable technical advance over the first, this method has also certain failings. Thus, for example, it is not possible, with oleum as the solvent and dehydrating agent, to produce colorless polyoxadiazole fibres as are desired by the textile industry. In consequence of the strong oxidizing action of the free sulphur trioxide dissolved in the oleum, technical grades of oleum are always dark coloured. The yellow or brown colour is transmitted to articles, e.g. fibres and foils formed from the polymer solution. A further change of colour to red tones takes place by oxidation of small quantities of oxidizable impurities which adhere to the technical starting materials, particularly isophthalic acid and the hydrazine salts (Iwakura loc. cit. page 46).

A further disadvantage of oleum as reaction medium is the high vapour pressure of the dissolved sulphur trioxide, which is partly released from solution at the necessary reaction temperatures of 70°–125° C., precipitates on the colder parts of the apparatus and in consequence of its tendency to form high melting condensation products (α form) leads to blocking the conduits and fittings.

Colourless polyoxadiazoles could also previously not be obtained by the use of polyphosphoric acid as condensing agent (Iwakura, loc. cit. page 53).

A further disadvantage of polyphosphoric acid is its high specific viscosity. With dissolved polyoxadiazole the viscosity rises to such an extent that serious limitation of the molecular weight or of the concentration must be undertaken in order to keep the spinning solution capable of being stirred and filtered. Since in the production of a spinning solution neither homogenization by stirring nor filtration can be dispensed with, the limitation of the molecular weight or the concentration (to 2–5 g. of polymer per 100 g.) are serious disadvantages for the quality of the fibre and/or the economy of the spinning process.

Further disadvantages of this process will become apparent on comparison with the process of the invention.

It has now been found that it is possible, whilst avoiding the foregoing disadvantages to produce linear aromatic poly-1,3,4-oxadiazoles by treatment of aromatic dicarboxylic acids whose carboxyl groups are separated by at least three carbon atoms, and which, under the reaction conditions, are inert towards sulphonation, and of functional derivatives of these carboxylic acids, with an inorganic salt of hydrazine, if the reaction is carried out at temperatures above 50° C. in chlorosulphonic acid, if desired in the presence of concentrated sulphuric acid and/or catalysts.

The reaction takes place in accordance with the following reaction scheme:

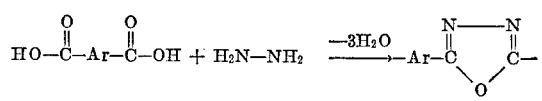

In this, Ar represents a divalent aromatic residue, inert towards sulphonation, whose linkages with the neighboring substituents are separated by a chain of at least 3 carbon atoms. The hydrazine is used in the form of its inorganic salt, e.g. as sulphate or hydrochloride.

Chlorosulphonic acid is, in commercial quality, a colourless liquid, so that coloured constituents are not transferred from this to the polycondensation mixture. The astonishing discovery was however not to be foreseen that chlorosulphonic acid would not oxidize to coloured products the impurities always present in commercial inorganic hydrazine salts even at high temperature. It was also astonishing that the presence of hydrogen chloride in the reaction mixture does not disturb the course of the polycondensation. No chlorination of the articles formed from aromatic poly-1,3,4-oxadiazoles is found to occur. Chlorosulphonic acid boils at 152° C. so that on working without pressure the condensing agent cannot escape from the polycondensation solution. At 140° C. there is obtained in 2–5 hours in a well reproducible manner colourless polyoxadiazoles with molecular weights of magnitudes unobtainable with known processes.

The process of the invention is thus characterized in that chlorosulphonic acid is used as the condensing agent.

The polycondensation of an aromatic dicarboxylic acid or a functional derivative with an inorganic hydrazine salt in the presence of chlorosulphonic acid is not confined to narrow stoichiometrical proportions. In general, the components are taken in the molecular ratio of 1:1:3, but excess quantities of hydrazine sulphate or chlorosulphonic acid do not disturb the course of the polycondensation or the molecular weight of the polymers. An excess of chlorosulphonic acid can serve as a diluent in order not to allow the viscosity of the solution to rise excessively in the closing phase of the polycondensation. The same object is achieved if mixtures of chlorosulphonic acid and concentrated sulphuric acid are used.

With the use of insufficient chlorosulphonic acid, i.e. less than 3 mols per mol of dicarboxylic acid or a corresponding functional derivative, copolymers are formed which exhibit both closed oxadiazole rings and open hydrazide groups in the molecular chain.

For the manufacture of aromatic poly-1,3,4-oxadiazoles according to the present invention, compounds are suitable which have the general formula:

$$X\text{—}Ar^1\text{—}(\text{—}Y\text{—}Ar^2\text{—})_n\text{—}X$$

wherein $Ar^1$ and $Ar^2$ each represent a benzene or naphthalene ring, $n$ a number from 0 to 3, Y a direct linkage or a divalent residue —$SO_2$—, —CO—, or —N=N—, and X a mono-valent group —COOH, —COCl, —COONa, —COOK, —CN, —$CONH_2$ or —$NHNH_2$, and the repeating residues (—Y—$Ar^2$—) may be the same or different. $Ar^1$ and $Ar^2$ are preferably the same and represent a benzene ring, $n$ is then 1. If $n=0$, $Ar^1$ represents a benzene or naphthalene ring. Both benzene and naphthalene rings may be further substituted, particularly the benzene ring by halogen, e.g. chlorine. X is preferably —COOH, COONa or COOK.

Examples of compounds of the above formula are:

Terephthalic acid
Isophthalic acid
5-methylisophthalic acid
5-chloroisophthalic acid
4-chloroisophthalic acid
Tetrachloroterephthalic acid
Naphthalene-1,4-; -1,5-; or -2,6-dicarboxylic acids
Benzophenone-4,4'-dicarboxylic acids
Triphenylsulphone-4,4'-dicarboxylic acids
Terephthalophenone-4,4'-dicarboxylic acids
Azobenzene-4,4'-dicarboxylic acids (so far as their individual colours are unobjectionable). In general, however, colourless starting materials are preferred.

Functional derivatives of the above may be used, particularly the alkali metal salts, acid chlorides, amides and nitrites. All these compounds can be used singly or in admixture. In the latter case, copolymers or terpolymers are formed with properties which may exceed those of the homopolymers. If halogenated aromatic dicarboxylic acids are used like tetrachlorterephthalic acid, or mixtures which contain halogenated dicarboxylic acids, products which are fairly noncombustible are obtained which may be highly desirable or even essential for certain uses, such as the textile industry.

The readiness of the said acids or their functional derivatives to condense with an inorganic hydrazine salt in the presence of chlorosulphonic acid to the polyoxadiazole is different. Certain functional derivatives, e.g. the alkali metal salts, acid chlorides and hydrazides, react particularly quickly. The free aromatic dicarboxylic acids react more slowly, but there are differences between them. Thus, isophthalic acid alone reacts very slowly but in admixture with terephthalic acid with a speed sufficient for practical purposes. Mixtures of terephthalic acid and isophthalic acid are therefore preferred for the manufacture of polyoxadiazoles according to the process of the invention.

As hydrazine components, technical sulphates, namely, hydrazine sulphate, $H_2N\text{—}NH_2.H_2SO_4$, and dihydrazine sulphate $(H_2N\text{—}NH_2)_2.H_2SO_4$ are suitable. Hydrazine hydrochloride can be used with equally good results. The inorganic hydrazine salt may, however, be formed in situ, by allowing hydrazine or hydrazine hydrate to react with an inorganic acid during the main reaction.

For practical carrying out of the process of the invention, one or more dicarboxylic acids or their functional derivatives and the inorganic salt of hydrazine are dissolved in chlorosulphonic acid or a mixture of sulphuric acid and chlorosulphonic acid, preferably in such quantitative ratio that a final concentration of about 10% polyoxadiazole is obtained in the reaction mixture. Higher or lower concentrations could be preferable if particularly low or extremely high molecular weights are to be obtained. The latter are formed by the process of the invention very readily if limitation of the molecular weight by the use of chain terminators is avoided. Suitable chain terminators are aromatic monocarboxylic acids like benzoic acid, p-toluic acid, halobenzoic acids, etc. The chain terminator is added in in quantities of 0.1 to 3% (molar percent) to one mol of the dicarboxylic acid.

The reaction temperatures are advantageously in general between 50° and 200° C. The preferred temperature range lies between 120° and 140° C., at which the polycondensation can be completed within 2 to 5 hours.

Cathalytic carrying out of the polycondensation to poly-1,3,4-oxadiazoles according to the invention is particularly to be recommended if the reaction is to be continuous, which is possible in tubular reactors or by the cascade principle.

Since the aromatic poly-1,3,4-oxadiazoles are infusible and insoluble in inorganic solvents, fibres, foils and similar endless articles can advantageously be formed directly from the polymerization apparatus by injection of the solution into a suitable precipitation bath. Known precipitation baths, not claimed here, are, e.g. water, dilute sulphuric acid or aqueous solutions of zinc chloride, sodium sulphate, ammonium sulphate, etc.

The polymer obtained in such an aqueous precipitation, both in powder form or as fibres or film, has a smaller molecular weight than the polyoxadiazole in the waterfree polymerization solution. This finding shows that in the polyoxadiazoles hydrolysable groups are present. This molecular structure occurs less if the polycondensation, as is the case in accordance with the invention, is carried out in chlorosulphonic acid instead of in oleum.

The molecular weight of the polyoxadiazole is shown in the present case by the reduced specific viscosity (RSV) of a 0.2% solution in concentrated (96%) sulphuric acid at 20° C., for which the following formula holds:

$$RSV=\frac{\eta_{rel.}-1}{C}$$

Herein $\eta$ rel represents the relative viscosity $$\left(=\frac{\text{viscosity of the solution}}{\text{viscosity of the solvent}}\right)$$

and C the polymer concentration in g./100 ml. of solvent. The following table shows in terms of RSV values the differing hydrolytic stability of an aromatic poly-1,3,4-oxadiazole copolymer made with the use of 75% of terephthalic acid and 25% of isophthalic acid.

|  | Manufactured in— | |
| --- | --- | --- |
|  | Oleum (30%) | Chlorosulphonic acid |
| Polycondensation final value | RSV=2.42 | RSV=2.50 |
| Polymer precipitated in water at 0° C | RSV=1.95 | RSV=2.28 |
| Polymer dissolved in 95% H₂SO₄ after— | | |
| 2 hours | RSV=1.90 | RSV=2.20 |
| 26 hours | RSV=1.29 | RSV=2.10 |
| 50 hours | RSV=1.09 | RSV=1.89 |

The example of this table is representative for a large number of homo- and copolyoxadiazoles which undergo much less hydrolytic degradation when they are made in chlorosulphonic acid instead of in oleum. This fact is of great practical importance, since several important properties, e.g. the crease endurance, abrasion resistance, and loop strength depend in all synthetic fibres on the molecular weight or RSV, and consequently may be considerably impaired by the degradation process.

A further opportunity producing polyoxadiazole fibres capable of being highly stressed is yielded by the fact that it is possible in accordance with the invention to produce polymers of very much higher molecular weight than with known processes. If the inherent and intrinsic viscosities stated in the literature are calculated in RSV values, previously only RSV values of about 8 were obtained. By the use of chlorosulphonic acid as condensing agent, RSV values between 25 and 30 are directly obtained, from which polyoxadiazole fibres and films of great durability and lasting mechanical strength can be made. For use as tire cord this resistance to fatigue is of great importance.

The following examples illustrate the invention. In these the reduced specific viscosity is always measured as a solution of 0.2 g. of polymer in 100 ml. of 96% sulphuric acid at 20° C.

EXAMPLE 1

In a three-necked flask, provided with a stirrer, thermometer and calcium chloride tube, 16.61 g. (0.1 mol) of terephthalic acid and 13.01 g. (0.1 mol) of hydrazine sulphate are placed. The mixture is treated with 150 ml. of chlorosulphonic acid and heated to 140° C. in an oil bath whilst stirring. At 90° C. a vigorous evolution of hydrogen chloride begins. After 2 hours the viscosity increases considerably, and after a further 30 minutes the water-clear solution can only be stirred with difficulty. The polycondensation is terminated, and after cooling, the contents of the flask are poured into iced water whilst vigorously stirring. The precipitated polymer is white, coarse grained, and extraordinarily tough. It is washed several times with hot water until the wash water reacts neutral. The product is finally dried at 150° C. in high vacuum.

The reduced specific viscosity of the polmer amounts to 3.25. The poly-p-phenylene-1,3,4-oxadiazole is soluble in sulphuric acid, chlorosulphonic acid and polyphosphoric acid. The infrared spectrum shows the band characteristic for 1,3,4-oxadiazoles at 970 cm.

EXAMPLE 2

81.08 g. (0.5 mol) of dihydrazine sulphate is placed in a 2 litre 3-necked flask provided with a stirrer, thermometer and a calcium chloride tube, and dissolved in 466 g. (266 ml., 4.0 mol) of chlorosulphonic acid. 694 g. of concentrated (100%) sulphuric acid is added as a diluent followed by 124.6 g. (0.75 mol) of terephthalic acid and 41.5 g. (0.25 mol) of isophthalic acid. Finally 5 g. of benzene sulphonic acid is added as a catalyst. The reaction mixture is heated to 135° C. With vigorous evolution of HCl, the viscosity rapidly rises at this temperature. After 45 minutes of condensation there exists a water-clear, very highly viscous solution, i.e. one which is hardly stirrable. A weight control reveals that 110.5 g. of hydrogen chloride has been removed from the condensation mixture (Theory: 109. 3 g., 3.0 mol).

The contents of the flask weighs 1446 g. and contains 10% by weight of polyphenylene-1,3,4-oxadiazole with statistically distributed para and meta coupling. The highly viscous, clear reaction mixture can be directly used as a spinning solution. Colourless fibres and films made from the solution show very high mechanical strength. The dynamic viscosity of the solution amounts to 18,000 poises at 20° C.

A test portion precipitated in iced water is white, infusible, and only soluble in concentrated sulphuric acid, chlorosulphonic acid and polyphosphoric acid. The reduced specific viscosity amounts to 26.2.

EXAMPLE 3

The procedure is as in Example 1, with the difference that instead of terephthalic acid, terephthalic acid chloride (20.3 g. 0.1 mol) is used. The polycondensation is complete after 10 minutes at 110° C. The poly-p-phenylene-1,3,4-oxadiazole is isolated by precipitation in iced water and worked up as is customary. The product is white, coarsely grained and very tough. The reduced specific viscosity amounts to 5.98.

EXAMPLE 4

The apparatus described in Example 1 is used. 15.62 g. (0.12 mol) of hydrazine sulphate is dissolved in 120 ml. of chlorosulphonic acid. 22.41 g. (0.1 mol) of disodium 5-methyl-isophthalate is introduced and the reaction mixture heated to 130° C. In one hour the polycondensation is complete. The highly viscous reaction mixture is worked up in the way detailed in Example 1. The reduced specific viscosity of the polymer amounts to 5.82.

EXAMPLE 5

The apparatus described in Example 1 is set up. 8.1 g. (0.05 mol) of dihydrazine sulphate is dissolved in a mixture of 40 ml. of chlorosulphonic acid and 60 ml. of concentrated sulphuric acid. At room temperature 29.83 (0.1 mol) of benzophenone-4,4'-dicarboxylic acid dihydrazide is introduced. An exothermic reaction begins, after 30 minutes the reaction mixture is heated to 120° C. and the polycondensation completed at this temperature. From the highly viscous polymer solution fibres of high strength can be drawn in aqueous sulphuric acid as a precipitating bath.

EXAMPLE 6

Into a 400 ml. three-necked flask, provided with a stirrer, thermometer and calcium chloride tube, 26.03 g. (0.2 mol) of hydrazine sulphate, 16.61 g. (0.1 mol) of terephthalic acid and 34.08 g. (0.1 mol) of tetrachloro-terephthalic acid dichloride are introduced and treated with 250 ml. of chlorosulphonic acid. The reaction mixture is heated to 145° C. and stirred at this temperature for 4 hours. The highly viscous solution is clear and colourless. After cooling, the copolymer obtained is precipitated in iced water and thoroughly washed. The product is finely granular and white. It is characterized by a much reduced combustibility. The reduced specific viscosity amounts to 1.42.

EXAMPLE 7

The process is carried out as in Example 6, with the difference that instead of tetrachlorophthalic acid dichloride, 30.63 g. (0.1 mol) of diphenylsulphone 4,4'-dicarboxylic acid is employed. To accelerate the condensation, 1 g. of p-toluenesulphonic acid is added. After 35 minutes reaction at 140° C. the polycondensation is complete. The working up of the product takes place in the customary way. The reduced specific viscosity of the copolymer amounts to 9.80.

What we claim is:

1. A process for the manufacture of linear aromatic poly-1,3,4-oxidiazoles which comprises reacting in chlorosulphonic acid at 50–200° C. an inorganic salt of hydrazine with an aromatic dicarboxylic acid having carboxyl groups separated by 3 or more carbon atoms, said acid being inert towards sulphonation, or a functional derivative thereof.

2. The process as recited in claim 1 wherein the functional derivative is an alkali metal salt, an acid chloride, or a hydrazide.

3. The process as recited in claim 1 wherein the temperature is 120–140° C.

4. The process as recited in claim 1 wherein the reaction is conducted in the presence of concentrated sulfuric acid, a catalyst or concentrated sulfuric acid and a catalyst.

5. The process as recited in claim 1 wherein the catalyst is an aromatic sulphonic acid.

6. The process as recited in claim 4 wherein the aromatic sulphonic acid is benzene sulphonic acid.

7. The process as recited in claim 1 wherein the aromatic dicarboxylic acid is of the formula:

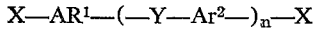

wherein
Ar$^1$ is a benzene or naphthalene ring;
Ar$^2$ is a benzene or naphthalene ring;
$n$ is 0–3;
Y is a direct bond, —N=N—, —SO$_2$—, or —CO;
X is a monovalent group selected from the group consisting of —COOH—, —COCl—, —COONa—, —COOK, —CN, —CONH$_2$ and —NHNH$_2$; and
when $n$=2 or 3, the (—Y—Ar$^2$—) radical in the aromatic dicarboxylic acid may differ from one another.

8. The aromatic dicarboxylic acid as recited in claim 7 wherein $Ar^1$ and $Ar^2$ represent a benzene ring and $n=1$.

9. The aromatic dicarboxylic acid as recited in claim 7 wherein $n=0$ and $Ar^1$ is a benzene or naphthalene ring.

10. The aromatic dicarboxylic acid as recited in claim 7 wherein the benzene and naphthalene rings are substituted by halogen.

11. The aromatic dicarboxylic acid as recited in claim 10 wherein the benzene ring is substituted by chlorine.

12. The aromatic dicarboxylic acid as recited in claim 7 wherein X is selected from the group consisting of —COOH, —COONa, and COOK.

13. The process as recited in claim 1 wherein the aromatic dicarboxylic acid is selected from the group consisting of terephthalic acid, isophthalic acid, 5-methylisophthalic acid, 5-chloroisophthalic acid, 4-chloroisophthalic acid, tetrachloroterephthalic acid, naphthalene-1, 4-dicarboxylic acid, naphthalene-1, 5-dicarboxylic acid, naphthalene-2, 6-dicarboxylic acid, benzophenone-4, 4'-dicarboxylic acid, diphenylsulphone-4, 4'-dicarboxylic acid, terephthalophenone-4, 4'-dicarboxylic acid, and azobenzene-4, 4'-dicarboxylic acid.

14. The process as recited in claim 1 wherein the aromatic dicarboxylic acid is terephthalic acid, isophthalic acid, or a mixture of terephthalic acid and isophthalic acid.

15. The process as recited in claim 14 wherein the terephthalic acid and the isophthalic acid are in a ratio of 3:1.

16. The process as recited in claim 1 wherein an alkali metal salt of the aromatic dicarboxylic acid is used.

17. The process as recited in claim 1 wherein the inorganic hydrazine salt is hydrazine sulphate, dihydrazine sulphate or hydrazine hydrochloride.

18. The process as recited in claim 1 wherein the aromatic dicarboxylic acid or a functional derivative thereof, the inorganic hydrazine salt and the chlorosulphonic acid is in a ratio of 1:1:3.

References Cited

UNITED STATES PATENTS 3,238,183  3/1966  Frazer _____ 260—78.4

OTHER REFERENCES

Y. Iwakura et al., J. Pol. Sci. A. 3, 1965, 45.
Frazer et al., J. Pol. Sci. A.2, 1964, 1157.
Y. Iwakura et al., J. Pol. Sci. A.3, 1965, 45.
Wilson, Def. Pub. of Ser. No. 805,938, filed Feb. 14, 1969, published in 866 O.G. 1437 on Sept. 30, 1969, 260—78.4.

JOSEPH L. SCHOFER, Primary Examiner

J. KIGHT III, Assistant Examiner

U.S. Cl. X.R.

260—30.8 R, 78 R, 79.3 M, 78.4 N